(12) United States Patent
Hickey (10) Patent No.: US 10,496,531 B1
(45) Date of Patent: Dec. 3, 2019

(54) OPTIMIZING VIRTUAL STORAGE GROUPS BY DETERMINING AND OPTIMIZING ASSOCIATIONS BETWEEN VIRTUAL DEVICES AND PHYSICAL DEVICES

(71) Applicant: EMC IP Holding Company LLC, Hopkinton, MA (US)

(72) Inventor: Charles J. Hickey, Aptos, CA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 30 days.

(21) Appl. No.: 15/499,480

(22) Filed: Apr. 27, 2017

(51) Int. Cl.
*G06F 9/455* (2018.01)
*G06F 11/34* (2006.01)
*G06F 11/36* (2006.01)

(52) U.S. Cl.
CPC ...... *G06F 11/3692* (2013.01); *G06F 9/45504* (2013.01); *G06F 11/3457* (2013.01); *G06F 11/3688* (2013.01); *G06F 11/3485* (2013.01)

(58) Field of Classification Search
None
See application file for complete search history.

(56) References Cited

U.S. PATENT DOCUMENTS

| | | | | |
|---|---|---|---|---|
| 6,529,995 | B1 * | 3/2003 | Shepherd | G06F 11/1435 707/999.202 |
| 6,693,766 | B1 * | 2/2004 | Wilkes | G11B 5/59611 360/78.08 |
| 7,281,106 | B1 * | 10/2007 | Arnan | G06F 3/061 711/112 |
| 7,360,017 | B2 * | 4/2008 | Higaki | G06F 3/0625 711/114 |
| 7,818,515 | B1 * | 10/2010 | Umbehocker | G06F 3/0605 711/114 |
| 8,595,436 | B2 * | 11/2013 | Satoyama | G06F 3/0614 711/114 |
| 9,348,526 | B2 * | 5/2016 | White | G06F 3/0619 |
| 9,626,110 | B2 * | 4/2017 | Sakata | G06F 3/06 |
| 2005/0172097 | A1 * | 8/2005 | Voigt | G06F 3/0613 711/170 |
| 2006/0218360 | A1 * | 9/2006 | Burkey | H04L 67/1095 711/154 |
| 2007/0043860 | A1 * | 2/2007 | Pabari | G06F 9/5072 709/224 |
| 2007/0180295 | A1 * | 8/2007 | Byrne | G06F 11/1076 714/6.12 |
| 2008/0162800 | A1 * | 7/2008 | Takashige | G06F 9/5077 711/104 |
| 2008/0313641 | A1 * | 12/2008 | Inoue | G06F 3/061 718/104 |
| 2010/0138764 | A1 * | 6/2010 | Hatambeiki | G08C 17/02 715/765 |
| 2012/0054554 | A1 * | 3/2012 | Dagan | G06F 11/0712 714/39 |

(Continued)

*Primary Examiner* — Abu Zar Ghaffari
(74) *Attorney, Agent, or Firm* — Fabian Vancott; Carl T. Reed (57) ABSTRACT

Systems and methods for aligning needs of virtual devices with hardware resources. The performance of virtual devices are tested using different groupings to determine mappings or relationships between the virtual devices and the physical devices from which they are drawn. Based on the results of the tests, spindle groups can be optimized.

15 Claims, 4 Drawing Sheets

(56) References Cited

U.S. PATENT DOCUMENTS

| | | | | |
|---|---|---|---|---|
| 2015/0106565 A1* | 4/2015 | Ayukawa | ............... | G06F 3/061 |
| | | | | 711/114 |
| 2015/0373119 A1* | 12/2015 | Kaneko | ............... | H04L 67/1097 |
| | | | | 709/219 |
| 2016/0259870 A1* | 9/2016 | Greenspan | .......... | G06F 17/5009 |
| 2016/0378773 A1* | 12/2016 | Vaghani | ................... | G06F 3/06 |
| | | | | 711/114 |
| 2017/0220287 A1* | 8/2017 | Wei | ........................ | G06F 12/06 |

\* cited by examiner

OPTIMIZING VIRTUAL STORAGE GROUPS BY DETERMINING AND OPTIMIZING ASSOCIATIONS BETWEEN VIRTUAL DEVICES AND PHYSICAL DEVICES

FIELD OF THE INVENTION

Embodiments of the present invention relate to systems and methods for aligning the needs of software with the capabilities of hardware. More specifically, embodiments of the invention relate to systems and methods for optimizing the associations between virtual and physical devices.

BACKGROUND

Maximizing the performance of a computer system often involves aligning the needs of software with the capabilities of hardware. This task is a considerably more difficult in virtual-machine environments where the particulars of the underlying hardware is hidden by design. This problem is often acute when deploying systems that are dependent on hard-disk based storage devices. Hard-disk based storage device are notoriously poor performers in virtualized environments when shared ineffectively.

The core of the problem is that hard disks may only have a single recording arm that must be swept across a spinning platter to service each request. Uncoordinated sharing between virtual machine (VM) guest operating systems (OSs) force the recording arm to beat while servicing requests. This can impact performance. This problem can also occur even when a guest-OS has exclusive access to its storage devices when the VM host has presented more than one virtual disk drawn from the same physical hard drive. In this case, the guest-OS can drive its own performance down by concurrently accessing two drives that it views as independent, but are actually conflicting with each other.

The complexity of the storage environment goes well beyond the limitations of hard disk drives. The relationships between virtual disks to physical resources can be many to many. When these resources are not managed properly, particularly in the context of virtual machines, performance can be negatively impacted. Systems and methods are needed to manage the relationships between virtual devices and physical devices and to align the needs of software with the hardware resources.

BRIEF DESCRIPTION OF THE DRAWINGS

In order to describe the manner in which at least some aspects of this disclosure can be obtained, a more particular description will be rendered by reference to specific embodiments thereof which are illustrated in the appended drawings. Understanding that these drawings depict only example embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Embodiments of the invention relate to systems and methods for aligning the needs of software with hardware resources. Embodiments of the invention further relate to systems and methods for managing associations between virtual devices and physical devices.

As used herein, a spindle group is referred to as a set of virtual devices (e.g., virtual disks (VDSK) that are treated as a single physical disk. By treating a set of virtual devices as a single physical disk, concurrent access to disparate locations on the drive are limited and performance is improved.

Consider for example a set of ten virtual devices each of which yield 100 IOPs (I/O requests per second) when measured individually. If each of these virtual devices was drawn from separate physical devices the overall throughput of the set of virtual devices would be 10×100, or 1000 IOPs, when accessed concurrently. However, if these ten virtual disks were all drawn from the same physical devices, accessing them concurrently would cause the contention described above, and the throughput of the set would decline to a fraction of the performance of accessing one device individually (e.g. 50-60 IOPs for the whole set of 10 virtual devices). Embodiments of the invention manage the associations between virtual devices and physical devices to minimize at least this type of contention for resources.

Embodiments of the invention thus relate to a virtual storage group optimizer that is configured, by way of example only and not limitation, to automatically determine the associations between the virtual devices and the physical devices and group these devices to maximize throughput and responsiveness.

Figure 1:
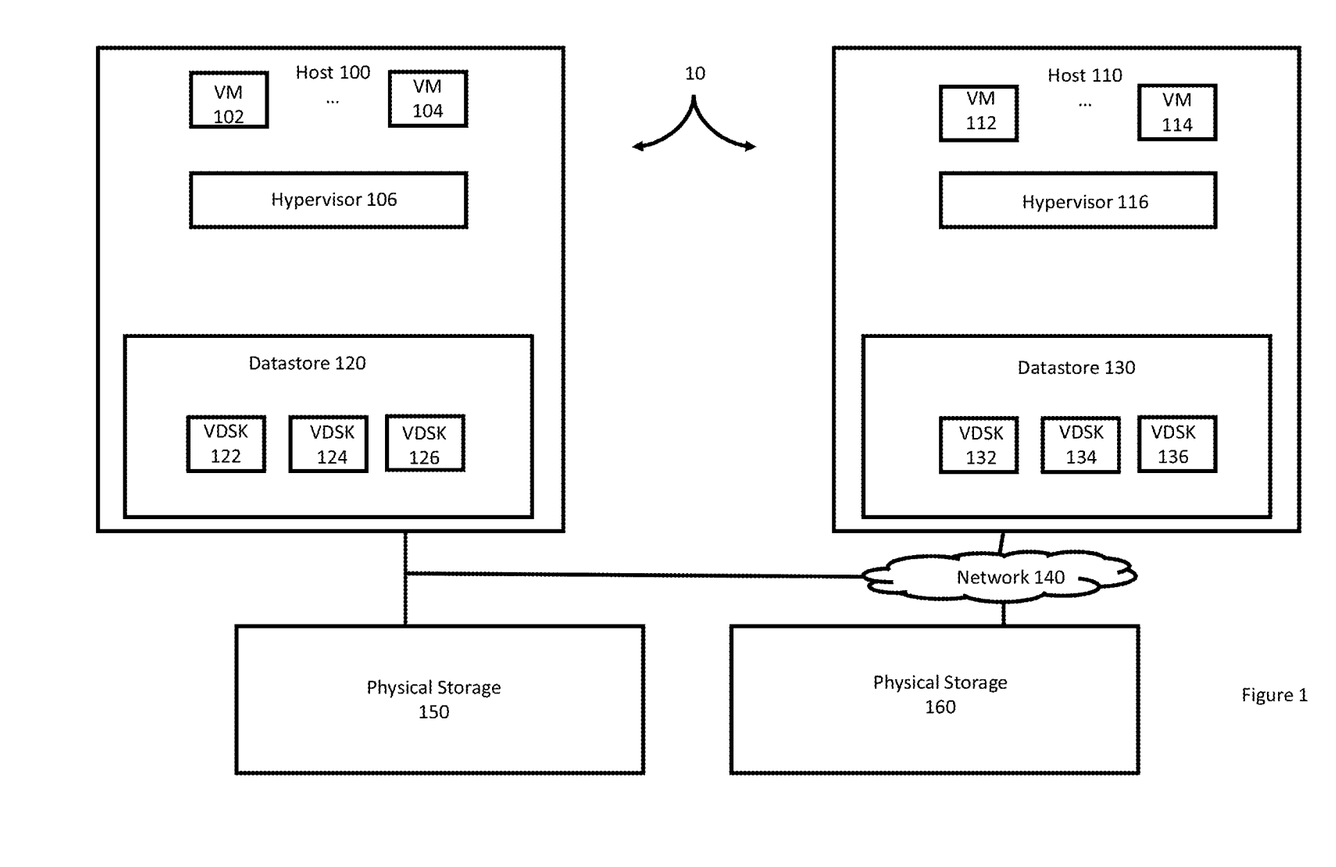
FIG. 1 illustrates an example of a computing system in which virtual storage groups are optimized.

FIG. 1 illustrates an example of a computing system in which spindle group assignments may be optimized or in which the needs of software are aligned with hardware resources. FIG. 1 illustrates a computing cluster 10 that includes multiple hosts, represented as hosts 100 and host 110. The host 100 may support multiple virtual machines, represented as virtual machines (VM) 102 and 104. A hypervisor 106 may be used to abstract or isolate operating systems and applications from the underlying hardware. The datastore 120 may include virtual disks (VDSK) 122, 124, 126. A virtual disk may include or be associated with a configuration file and with a virtual disk file. The virtual disk file represents a physical disk to a guest operation system. Thus, the virtual machines 122, 124 and 126 may be associated with or have access to the virtual disks in the datastore 120, which is a collection of virtual disks.

The host 110 may be similarly configured with virtual machines 112, 114, a hypervisor 116, and a datastore 130 that includes virtual disks 132, 134 and 136.

The datastores 120 and 130 may be mapped to the physical storage 150 and/or 160. The physical storage 160, in this example, may be accessed through a network 140. In other words, the physical storage 150 and/or 160 may include physical disk drives and may be configured or accessed using various protocols including NAS, iSCSI, FC SAN, DAS SCSI, and the like or combination thereof.

The relationships between the virtual disks in the datastores 120, 130 and the physical storage 150 and 160 may be many to many as illustrated in FIG. 1. Embodiments of the invention enable the associations between the virtual disks and the physical storage to be managed or optimized to improve throughput and performance.

To optimize grouping or to optimize the associations between virtual devices and physical devices, a series of tests are performed on a set of virtual devices to determine which virtual devices are actually physically related to each other and which virtual device are not physically related to each other. Assuming, for example, that two virtual devices that are physically related will run slower when tested together than when tested apart, the best combinations can be determined empirically.

When more than a handful of devices are involved, it may not be possible or feasible to enumerate all the combinations. Embodiments of the invention may use the following algorithm to solve this problem in time T: $T=(N+4 \log N-2)*C$.

In this example, C=per-test time and N=number of virtual-disks.

Embodiments of the invention can effectively scan the problem space on a mass scale in this manner.

Assuming an individual per-test time C of 10 seconds, and 32 virtual devices that need to be tested, the base-2 log of 32 is 5. In this example, the total time needed is (32+20)*10 or 520 seconds-about 8.5 minutes.

Embodiments of the invention test devices in at least two ways. First, the virtual devices are tested individually to establish a baseline. Second, the virtual devices are tested in combination with other devices to detect a decline in performance. During the comparative phases, half of all of the virtual devices are tested each time. The virtual devices are tested in successive smaller consecutive groupings and at different offsets.

For each device, a structure is maintained that contains its baseline performance numbers and two lists, each of which begins the process empty. The first or "A" list contains the names of the devices that the virtual-device is associated with, and the second or "U" list contains devices that the virtual-device is most definitely not associated with.

An example method may be performed as follows. This example assumes that there are 32 virtual devices. The virtual devices may be referred to as virtual disks or drives, which are example of virtual devices. First, each virtual device is tested individually for C seconds and the performance of each virtual device is recorded. For 32 virtual disks or devices, this will take 320 seconds using a 10 second test (C=10 by way of example only). This initial test provides baseline performance numbers for every virtual device. Next, a series of tests will be performed. In this example, half of the virtual devices will be tested together, in sequential blocks or groupings declining by half down to 1 (e.g., 16, 8, 4, 2 and 1 in this example), and at offsets of 0, ½, 1 and 1 ½ times the size of the block or grouping. Thus, each of these groupings is tested at each of the offsets.

The virtual devices are numbered, for convenience, as virtual devices 1-32. Because half of the virtual devices are tested at a time, the 32 virtual devices are divided in half and the first 16 virtual devices (virtual devices 1-16) are tested together. Thus, the first group size is 16 and the offsets for this group size are 0, 8, 16 and 24. The offsets are used, in one example, to identify which virtual device is the first virtual device in the grouping. For offset 0, virtual device 1 is the first virtual device. For offset of ½ the group size (8=16*0.5), the first virtual device in the grouping is the virtual device 8.

Thus, with a device count of 32, the 32 devices are divided in half and the first 16 virtual devices (virtual devices 1-16) are tested together in parallel. This grouping of devices 1-16 corresponds to an offset of 0.

After testing these virtual devices (1-16), the results for each virtual device are examined and compared to the test where the virtual devices were tested individually. If the performance of the virtual device did not decline, the virtual device is unassociated with any other virtual device or disk in that test-block or in that grouping. If the virtual device or disk is unassociated with any of the other 15 virtual disks that were tested as a block or group, this drive is added to a list of unassociated drives.

If the performance of a virtual device did decline, then the virtual device is deemed associated with all of the other virtual devices in that block or grouping whose performance also declined. However, the definitiveness of that association will be further determined in the subsequent tests.

The process is repeated with an offset of half of the group size (offset 8) in this example. Thus, the test is performed on the virtual devices 8-24. In one embodiment, the same test is performed.

Next, the process is repeated with an offset 1 or of the group size (16 in this case) and the test is performed on the virtual devices 17-32.

Finally, the process is repeated on the group size with an offset of 24 (1.5 times the group size). This test is performed on devices 25-32 and 1-8.

Next, the block or group size is divided in half from 16 to 8 and the test is again performed on half of the virtual devices for offsets 0, 0.5, 1.0 and 1.5 of the group or block size. Because the block size is 8, the offsets are 0, 4, 8 and 12. Thus, the tests are performed on the following groupings of virtual devices:

Offset 0: virtual devices 1-8 and 17-24;
Offset 4: virtual devices 5-12 and devices 21-28;
Offset 8: virtual devices 9-16 and devices 25-32; and
Offset 12: virtual devices 13-24 and devices 29-32, 1-4.

After each test, the results are evaluated by comparing the performance of the virtual devices when tested in a group with the performance when tested alone. This is used to determine whether the virtual disk is associated or unassociated.

The foregoing process is then repeated at smaller test group or block size. The test group or block is now reduced to four and tested at the four offsets (0, 2, 4, 6) as follows:

Offset 0: virtual devices 1-4, 9-12, 17-20 and 25-28;
Offset 2: virtual devices 3-6, 11-14, 19-22, and 27-30;
Offset 4: virtual devices 5-8, 13-16, 21-24 and 29-32; and
Offset 6: virtual devices 7-10, 15-18, 23-26, and 31-32, 1-2;

The process is then repeated as the test group or block is reduced to 2 and tested at offsets (0, 1, 2, 3)

This results in the following groups of virtual devices to be tested:

Offset 0: virtual devices 1-2, 5-6, 9-10, 13-14, 17-18, 21-22, 25-26, 29-30;
Offset 1: virtual devices 2-3, 6-7, 10-11, 14-15, 18-19, 22-23, 26-27, 30-31;
Offset 2: virtual devices 3-4, 7-8, 11-12, 15-16, 19-20, 23-24, 27-28, 31-32
Offset 3: virtual devices 4-5, 8-9, 12-13, 16-17, 20-21, 24-25, 28-29, 32-1

The process is then repeated as the test block is reduced to 1. In this case, only offsets 0 and 1 need be tested. This results in the following groups to be tested:

Offset 0: virtual devices 1, 3, 5, 7, 9, 11, 13, 15, 17 19, 21, 23, 25, 27, 29 and 31;
and Offset 1: virtual devices 2, 4, 6, 8, 10, 12, 14, 16, 18, 20, 22, 24, 26, 28, 30, 32.

The final results are obtained by walking the list of virtual devices and collecting the associated list of associated virtual devices for each virtual device. These are the spindle-group assignments to be used when being used as storage.

Figure 2:
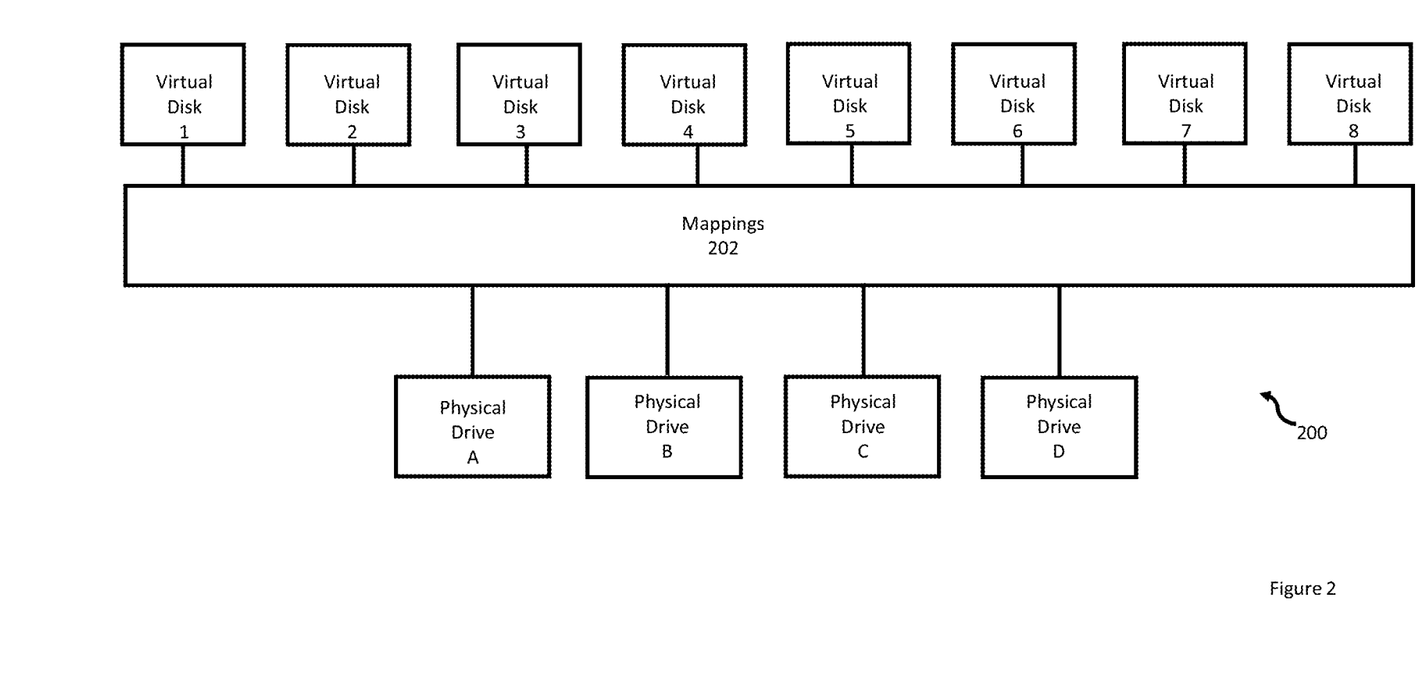
FIG. 2 illustrates an example of mappings and relationships between virtual disks and physical drives.

FIG. 2 illustrates an example of virtual devices that are drawn or associated with physical devices . . . FIG. 2 illustrates a group of eight virtual devices that are associate with or mapped to four physical drives. FIG. 2 thus illustrates virtual devices 1-8 (dev1-dev8) and physical devices or drives A-D. The mappings 202 identify how the virtual devices 1-8 correspond to the physical drives A-D. Embodiments of the invention optimize the mappings 202.

Figure 3:
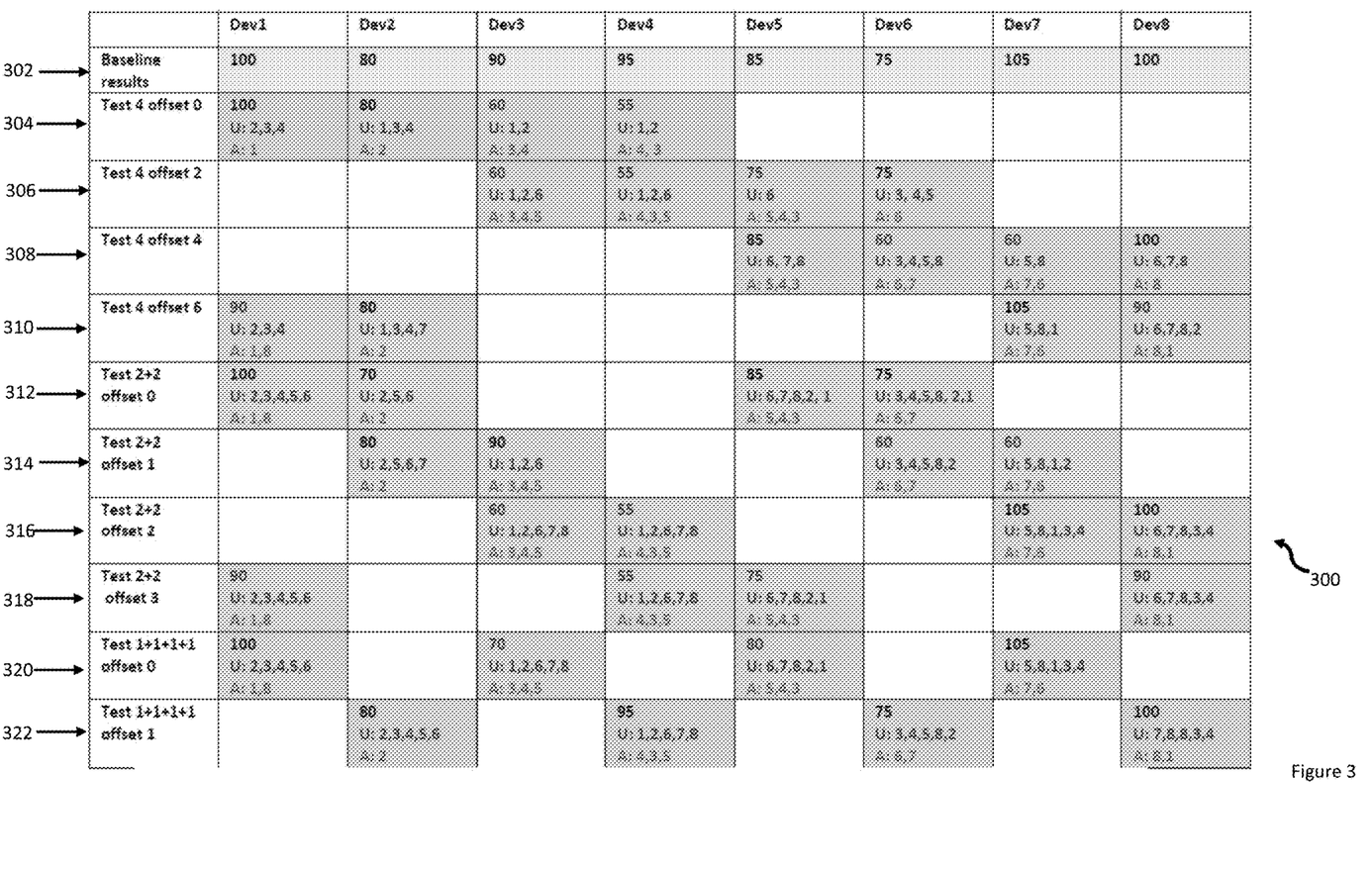
FIG. 3 illustrates a graph illustrating tests performed on different groupings of virtual devices and results of the tests.

With reference to FIGS. 2 and 3, the process for optimizing the associations is illustrated and described. FIG. 3 illustrates the manner in which the devices are tested such that the groupings or spindle groups can be optimized.

Initially, all of the virtual devices are tested individually. This provides, as illustrated in row 302 a baseline value for each of the virtual devices 1-8.

In this example, there are 8 virtual devices and half of the virtual devices are tested at a time. Thus, four virtual devices are tested at a time in different groupings or blocks. In this example, the block or group size for the groupings include 4 virtual devices, 2 virtual devices, and 1 virtual device. Rows 304, 306, 308, and 310 illustrate tests where the group or block size is four virtual devices and the offsets are 0, 0.5, 1.0, and 1.5 times the block size (4 in this case). This corresponds to an offset of 0 in row 302 (testing virtual devices 1-4), an offset of 2 in row 306 (testing virtual devices 3-6), an offset of 4 in row 308 (testing virtual devices 5-8), and an offset of 6 in row 310 (testing virtual devices 7-8, 1-2).

For each test, the results are evaluated. In FIG. 3, the results of the test for each virtual device are illustrated. The results of the tests are specific to the devices that are being tested. For a given block of devices, the U represents unassociated virtual devices and the A represents associated virtual devices. A virtual device can be associated with itself.

Consider the results of the test in row 304. With regard to virtual device 1 the performance when tested alone is 100 (as shown in row 302). In row 304 when tested with virtual devices 2-4, the performance of virtual device 1 did not change. Because the performance did not change, the virtual device 1 is an unassociated virtual device. The virtual device 1 is not associated with any of the virtual devices 2-4. Thus, the virtual drives 2-4 are added to the unassociated list (U:2,3,4) and the device 1 is essentially associated with itself (A:1). The virtual device 2 can be similarly analyzed.

The remaining virtual devices in this test (devices 3 and 4) in row 302 experienced a performance decline. The test results associated with the virtual device 3 are as follows: U:1,2 and A: 3,4. Thus, the virtual device 3 is not associated with devices 1 and 2, but is associated with the virtual device 4. Similarly, the results for the virtual device 4 show that it is unassociated with virtual devices 1-2 (U: 1,2) and associated with device 3 (A: 4,3)

The same test for a group size of 4 virtual devices is then repeated at offset 2 (row 306), at offset 4 (row 308), and offset 6 (row 310). The second test in row 306 has the same group size, but groups different virtual devices. The results of these tests are illustrated in the corresponding rows. For example, although the virtual device 1 was an unassociated virtual drive when the virtual devices 1-4 were tested together, row 310 shows that the performance of the virtual device 1 declined when the virtual device 1 was tested with the virtual devices 1-2 and 7-8. More specifically, the virtual devices 1 and 8 showed a performance decline Once the tests (e.g., as shown in rows 304, 306, 308 and 310) are completed for this block size (four), the block size is halved to two and the tests are repeated, for a group size of 2 virtual devices, at offsets of 0, 1, 2 and 3. These tests and results are shown in rows 312, 314, 316, and 318.

Thus, while half of the virtual devices are tested in each test regardless of the group size in some embodiments, the groupings of virtual devices change with each offset and with the different block groupings. The test at offset 0 for a block size of 2 includes devices 1-2 and 5-6 in row 312. The test results and groupings for the other offsets for the block size of two are shown in rows 314, 316, and 318.

After these tests are completed, the block size is divided in half from 2 to 1. When the block size is 1, only offsets 0 and 1 need to be performed. This is illustrated in rows 320 and 322.

For a given test and for a given virtual device, all virtual devices whose performance does not decline are added to the U lists of those devices that did experience a decline of performance. The virtual devices whose performance declines are added to the A list of the virtual devices whose performance also declined. Virtual devices whose performance does not decline are added to their own A list. Virtual devices whose performance declines are added to their own U list.

In FIG. 3, the question of whether a device is unassociated or associated is specific to the device in one embodiment. Consider the virtual device 1 in the row 304. The performance of the virtual device 1 did not decline in this test in row 304. By asking which virtual devices are associated, the answer is itself. By asking which devices are unassociated, the answer is virtual devices 2, 3, and 4. Proceeding to the row 310 and asking the same questions, the unassociated devices remain unchanged while the device 8 is added to the A list because the performance of both devices 1 and 8 declined in the test of the row 310.

FIG. 3 thus illustrates the results of the tests described herein and illustrates that the lists (the associated and unassociated lists) are maintained and cumulative as the tests are conducted. With regard to the virtual device 1, for example, the first test in row 304 included U: 2, 3, 4 and A: 1. After the last test in row 322 was conducted, the lists for the virtual device 1 included U: 2, 3, 4, 5, 6 and A: 1, 8. The final lists for all of the virtual devices 1-8 can be determined in this manner after all tests have been completed.

Once the testing is completed, the spindle groups can be identified based, in one embodiment, on the A lists. The A lists indicate the following spindle groups:
  spindle group 1: virtual devices 1, 8
  spindle group 2: virtual device 2
  spindle group 3: virtual devices 3, 4, 5
  spindle group 4: virtual devices 6, 7

The results can be used, if necessary, to change the spindle groups. For example, the virtual device 5 could be moved to the spindle group 2. Similar testing could performed to determine whether performance increased once the spindle groups are rearranged based on the testing. In one embodiment, the spindle groups can be used to determine how new virtual devices are added to the existing physical devices.

Figure 4:
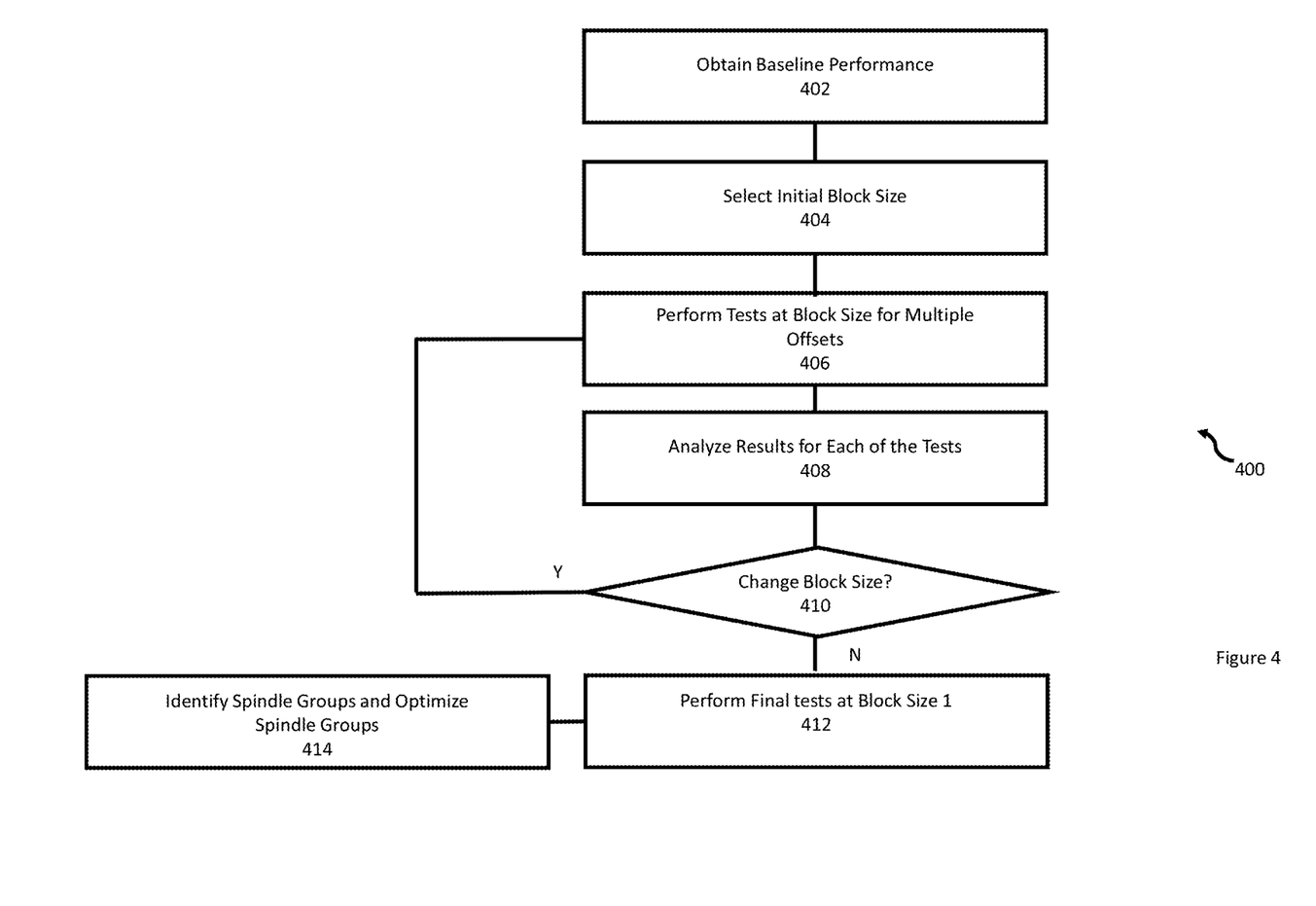
FIG. 4 illustrates an example of a method for grouping virtual storage devices with respect to physical drives.

FIG. 4 illustrates an example of a method 400 for optimizing spindle groups. In the method 400, a baseline performance is determined 402 for all of the virtual devices subject to the optimization process. The virtual devices may or may not be part of the same datastore. Further, the specific relationships between the virtual devices and the underlying physical devices may not be known and may not be optimized.

Next, an initial block size is selected 404. In one example, the initial block or group size is half of the virtual device count. The initial block size corresponds to or is based on the number of virtual devices tested at the same time even though the block size decreases as the method progresses. As in the previous example, if the number of devices is 8, the initial block size may be 4. However, the initial block size may be smaller.

Generally, the initial block or group size is ½ the number of virtual devices. This number may be rounded up to the nearest integer number. Then, the group or block size declines by half after the tests for the current block size are performed at the four offsets.

Next, tests are performed 406 on the current block size at different offsets. The offsets are 0, ½, 1, 1 ½ times the current block size. In this example, four tests are performed (one at each offset) for the current block size. The block size is then halved and four tests are performed again (one at each offset). When the block size drops to 1, only offsets 0 (even numbered virtual devices) and 1 (odd numbered virtual devices) are tested. This is the "−2_in the formula $T=(N+4 \log N-2)*C$ The offsets for the testing 8 devices with a current block size 4, for example, are 0, 2, 4 and 6. When the block size is reduced to 2, the offsets become 0, 1, 2 and 3. In some examples (and as illustrated in FIG. 3), the offsets can result in wrap around. For example, with 8 virtual devices, a block size of 4 and an offset of 7, the virtual devices tested are 7,8,1,2 (or 6,7,0,1 if the first virtual device is dev0 instead of dev1).

Next, the results of the tests are analyzed 408. The results can be determined after each test or after all tests for all offsets at the current block size, or the like. The tests measure the performance of the virtual devices during concurrent access. Each device is related to or placed in at least one unassociated list and/or at least one associated list. These lists are updated for each test. As the tests progress, these lists are updated as new groupings and information becomes available through the testing.

The results may be processed as follows for each test block.

Pass A: Process the virtual drives that did not show a drop in performance—these are unassociated drives. Each of these virtual devices is not associated with all of the other virtual devices that were tested as a block. Thus, each virtual drive that did not show a drop in performance is added to the U list of all the other virtual drives in this test block. If any of these unassociated drives are present on the A list of the other drives in the test-block, remove them.

Pass B: Process the virtual drives that did show a drop in performance. All of these virtual devices may be associated with the other virtual devices showing a performance drop in this test-block. Add each virtual device showing a performance drop to the A list of the other virtual devices showing a performance drop, unless that virtual device has this virtual device in its U list.

After the tests are completed and analyzed for the initial block size, the block size may be changed 410. If the block size is not 1 or is 2 or greater, then the block size is reduced by one-half and elements 406 and 408 are repeated as discussed herein. If the block size is 1 and the block size is not changed or reduced, then final tests are performed 412. In this case, tests only need be performed at offsets 0 and 1. The results and then identified and the lists are updated.

Finally, the spindle groups are identified 414 and spindle groups can be optimized if necessary. The method 400 can identify the mappings or associations between virtual devices and physical drives or devices. Alternatively, the method 400 may identify which virtual devices are associated with the same physical drive or device. With this information, the virtual devices can be moved or rearranged to better utilize the physical resources.

In other embodiments of the invention, the number of devices tested at a time could be less than one-half. One-fourth could be tested at a time using a similar process. However, testing fewer than one-half at a time will increase the number of test generations.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein.

As indicated above, embodiments within the scope of the present invention also include computer storage media, which are physical media for carrying or having computer-executable instructions or data structures stored thereon. Such computer storage media can be any available physical media that can be accessed by a general purpose or special purpose computer.

By way of example, and not limitation, such computer storage media can comprise hardware such as solid state disk (SSD), RAM, ROM, EEPROM, CD-ROM, flash memory, phase-change memory ("PCM"), or other optical disk storage, magnetic disk storage or other magnetic storage devices, or any other hardware storage devices which can be used to store program code in the form of computer-executable instructions or data structures, which can be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' can refer to software objects or routines that execute on the computing system. The different components, modules, engines, and services described herein may be implemented as objects or processes that execute on the computing system, for example, as separate threads. While the system and methods described herein can be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention can be performed in client-server environments, whether network or local environments, or in any other suitable environment. Suitable operating environments for at least some embodiments of the invention include cloud computing environments where one or more of a client, server, or target virtual machine may reside and operate in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for determining associations between virtual devices and physical devices, the method comprising:
    obtaining a baseline performance for each of the virtual devices, wherein the virtual devices are associated with virtual machines and wherein the virtual devices are associated with the physical devices;
    performing a plurality of tests using different groupings of the virtual devices to determine a performance of the virtual devices with respect to the different groupings, wherein the plurality of test are performed using different offsets for each of the different groupings;
    associating each of the virtual devices with at least one of an associated list or an unassociated list for each of the virtual devices, wherein for each test and for each virtual device in the group associated with each test:
    placing the virtual device on the unassociated lists of the remaining virtual devices in the group when the performance of the virtual device does not decline compared to the baseline performance;
    when the plurality of tests are completed, determining spindle groups for the virtual devices based on the associated list or the unassociated list, wherein each spindle group includes a set of virtual devices, wherein the spindle groups are configured to optimize throughput of the virtual devices.

2. The method of claim 1, wherein the groupings including groupings of multiple block sizes, each block size corresponding to a certain number of the virtual devices.

3. The method of claim 1, wherein each of the virtual devices whose performance does not decline during the plurality of tests is placed on its own associated list.

4. The method of claim 1, wherein the virtual device is placed on the associated lists of all devices in the group being tested whose performance declined during the test when the performance of the virtual device declines.

5. The method of claim 1, further comprising collecting results after each test, wherein the results are accumulated over all of the tests.

6. The method of claim 1, further comprising organizing the virtual devices to optimize the spindle groups.

7. A method for determining relationships between virtual devices and physical devices, the method comprising:
    obtaining a baseline performance for each virtual device included in the virtual devices, wherein the virtual devices are associated with virtual machines, wherein the virtual devices are associated with the physical devices;
    performing a test on a group of virtual devices selected from the virtual devices to generate test results that include a performance for each of the virtual devices in the group of virtual devices, wherein the group includes less than all of the virtual devices, wherein each of the virtual devices is associated with an associated list and an unassociated list;
    for each of the virtual devices, when the performance of the virtual device is less than the baseline performance during the test, adding the virtual device to the associated lists of other virtual devices in the group whose performance was less than their corresponding baseline performance;
    when the performance of the virtual device does not decline relative to the baseline performance during the test, adding the virtual device to its own associated list; and
    assigning the virtual devices to spindle groups based on the associated lists and the unassociated lists, wherein the spindle groups are configured to optimize associations between the virtual devices and the physical devices in order to optimize through put of the virtual devices, wherein each spindle group includes a set of physical devices.

8. The method of claim 7, further comprising adding the virtual device to the unassociated lists of the other virtual devices in the group whose performance did not decline when the performance of the virtual device declines.

9. The method of claim 8, further comprising, when the performance of the virtual device does not decline, adding the virtual device to the unassociated lists of the virtual devices in the group whose performance declined.

10. The method of claim 7, further comprising performing the test on different groups of devices, wherein multiple tests are performed on the different groups.

11. The method of claim 10, wherein the multiple tests are performed using groupings that are based on different offsets, wherein each offset identifies a start of one of the groupings.

12. The method of claim 11, wherein the plurality of tests are performed using different block sizes.

13. The method of claim 7, further comprising performing a plurality of tests for a plurality of virtual devices and determining the spindle groups for the plurality of virtual devices based on test results from the plurality of tests.

14. The method of claim 13, further comprising rearranging the virtual devices associated with the spindle groups to optimize the spindle groups.

15. The method of claim 7, wherein the test is performed for a certain amount of time.

* * * * *